United States Patent
Uhlir et al.

(10) Patent No.: US 7,628,704 B1
(45) Date of Patent: Dec. 8, 2009

(54) GEOGRAPHIC DATA COLLECTION USING GAME PLAY

(75) Inventors: Kurt Brooks Uhlir, Chicago, IL (US); Michael V. Shuman, Chicago, IL (US); Christopher Dougherty, Highland Park, IL (US)

(73) Assignee: Navteq North America, LLC, Chicago, IL (US)

( * ) Notice: Subject to any disclaimer, the term of this patent is extended or adjusted under 35 U.S.C. 154(b) by 340 days.

(21) Appl. No.: 11/453,449

(22) Filed: Jun. 15, 2006

(51) Int. Cl.
*A63F 13/00* (2006.01)
*G01C 21/00* (2006.01)

(52) U.S. Cl. .................. 463/42; 463/40; 701/213

(58) Field of Classification Search .................. 463/29, 463/36; 701/213
See application file for complete search history.

(56) References Cited

U.S. PATENT DOCUMENTS

| | | | | |
|---|---|---|---|---|
| 2,026,082 | A | 12/1935 | Darrow | 273/134 |
| 5,526,479 | A | 6/1996 | Barstow et al. | 395/152 |
| 5,573,402 | A | 11/1996 | Gray | 434/69 |
| 5,616,079 | A | 4/1997 | Iwase et al. | 463/32 |
| 6,131,085 | A * | 10/2000 | Rossides | 705/1 |
| 6,173,277 | B1 | 1/2001 | Ashby et al. | 707/1 |
| 6,183,364 | B1 | 2/2001 | Trovato | 463/32 |
| 6,183,634 | B1 | 2/2001 | Du Toit et al. | 201/94 |
| 6,401,033 | B1 | 6/2002 | Paulauskas et al. | 701/207 |
| 6,509,869 | B2 | 1/2003 | Aoyama | 342/357.13 |
| 6,612,925 | B1 | 9/2003 | Forsberg | 463/6 |
| 6,677,858 | B1 | 1/2004 | Faris et al. | 340/573.1 |
| 6,691,032 | B1 * | 2/2004 | Irish et al. | 701/213 |
| 2002/0063654 | A1 | 5/2002 | Aoyama | 342/357.13 |
| 2002/0187831 | A1 | 12/2002 | Arikawa et al. | 463/32 |
| 2003/0195023 | A1 | 10/2003 | Di Cesare | 463/9 |
| 2005/0202861 | A1 | 9/2005 | Dougherty et al. | 463/1 |
| 2005/0202862 | A1 | 9/2005 | Shuman et al. | 463/9 |
| 2005/0202877 | A1 | 9/2005 | Uhlir et al. | 463/43 |
| 2005/0203922 | A1 | 9/2005 | Uhlir et al. | 707/100 |

FOREIGN PATENT DOCUMENTS

EP          1 107 189          6/2001

(Continued)

OTHER PUBLICATIONS

Yuan, Li and Buckman, Rebecca, "Social Networking Goes Mobile-MySpace, Facebook Strike Deals with Cell Companies; A New Set of Safety Concerns", *Wall Street Journal*, Apr. 4, 2006.

(Continued)

*Primary Examiner*—Dmitry Suhol
*Assistant Examiner*—Thomas H Henry
(74) *Attorney, Agent, or Firm*—Adil M. Musabji; Frank J. Kozak; Jon D. Shutter

(57) ABSTRACT

A method is disclosed for collecting geographic data during game play. A game scenario includes an activity for the game player to perform. The game player may be given an incentive within the context of the game for performing the activity. The incentive may be of non-monetary, monetary or in-game value. Performing the activity within the context of the game directly or indirectly results in the generation of data that is collected and used for the purpose of updating, adding to or supplementing a geographic database.

24 Claims, 3 Drawing Sheets

FOREIGN PATENT DOCUMENTS

| WO | WO 98/54682 | 12/1998 |
| WO | WO 02/26518 A1 | 4/2002 |
| WO | WO 02/39363 A1 | 5/2002 |

OTHER PUBLICATIONS

Wingfield, Nick, "Beyond Brick Breaker", *Wall Street Journal*, Apr. 4, 2006.

Quick, After Him: Pac-Man WentThataway, The New York Times, Section 9-Sunday Styles, pp. 1 and 11. (May 9, 2004).

Pac Manhattan, http://pacmanhattan.com/yourcity.php, pp. 1-3, (2004).

Map Quests, WIRED, p. 052 (Feb. 2004).

Klaus, Todd; Terra Scene V2.0, TerraScene Scenery Generation System—Tutorials and Reference Guide; XP002335169, pp. 1-63; http://library.avsim.net/sendfile.php?; Apr. 2004.

Freedman, Jonah, *Map Quests*, XP002335320, 1 page, http://www.wired.com/wired/archive/12.02/play_pr.html> Feb. 2004.

*Microsoft Flight Simulator 2002 Software Development Kit*; Autogen, XP002335786, pp. 4, 6-8, http: //microsoft.com/games/flightsimulator/fs2002_downloads_sdk.asp#scenery>; Apr. 2002.

Muller, Chris; Denney, Eddie; *AVSIM Commercial Scenery Review*; Real Scene U.S. Terrain Mesh Scenery for FS2002; XP002335787, entire document; http://www.avsim.com/pages/0402/realscene_terrainmesh/rs_us_tms.html; Apr. 2002.

*3D Nature*: "What is Visual Nature Studio" EP002335442, entire document http://web/archive.org/web/20040202220153; http: //wwww.3dnature.com/vnsinfo.html>, Feb. 2004.

3D Nature PLC, LTD.; "Comparison of features" *World Construction Set, Visual Nature Studio*, ' Online!', XP002335684, http://web.archive.org/web/20031206133238/ http://www.3dnature.com/comparingfeatures.html>, entire document (Dec. 2003).

Cable, Tim; Klaus, Todd; *AVSIM Freeware Utility Review*, Terra Scene, XP002335170, entire document, http://avsim.com/pages/0500/terrascene/terrascene.shtml> May 2000.

Koller et al., "Virtual GIS: A Real-Time 3D Geographic Information System", *Proceedings of 6th IEEE Visualization Conference*, XP002335667, pp. 94-100 (Oct. 1995).

\* cited by examiner

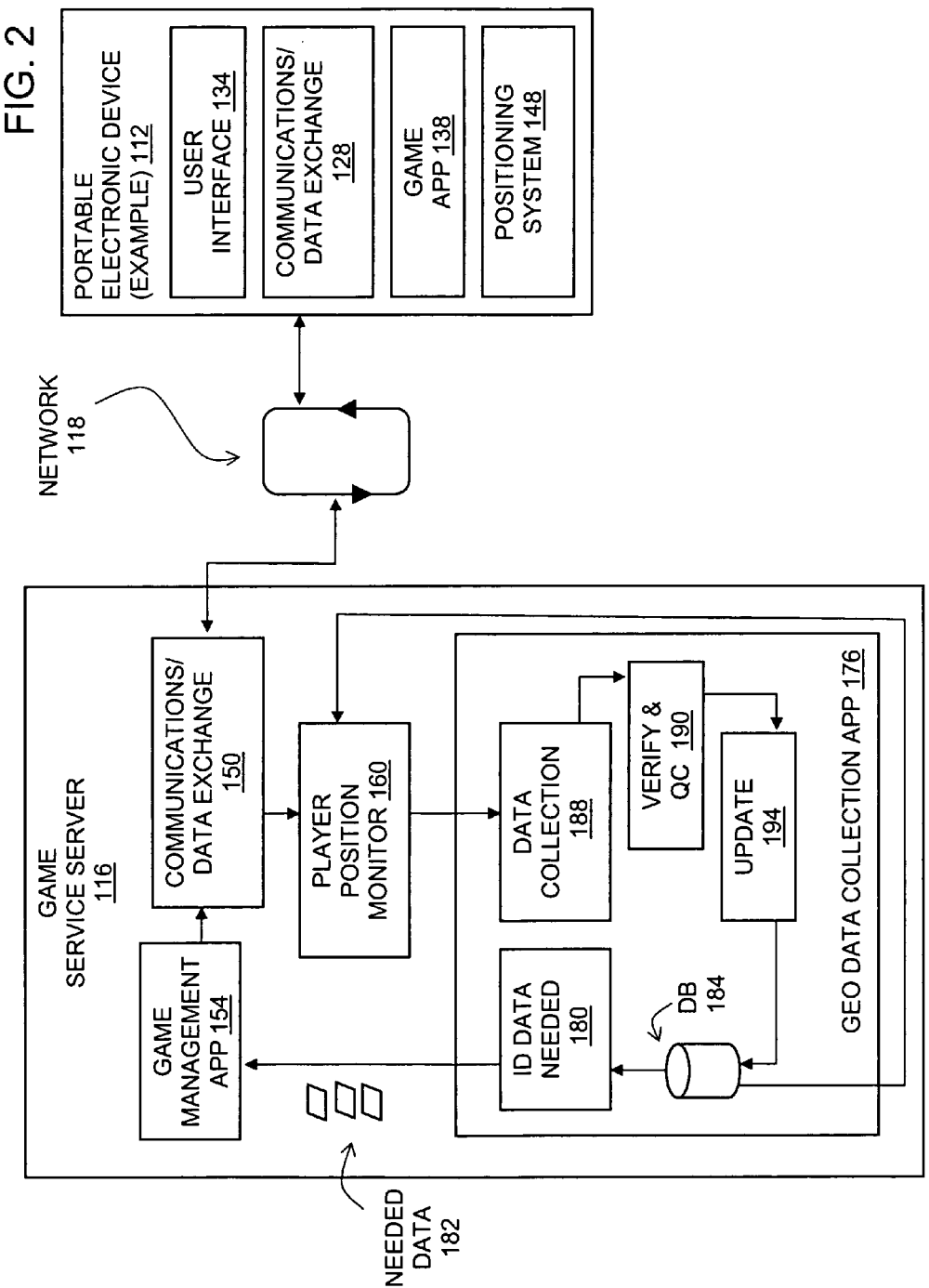

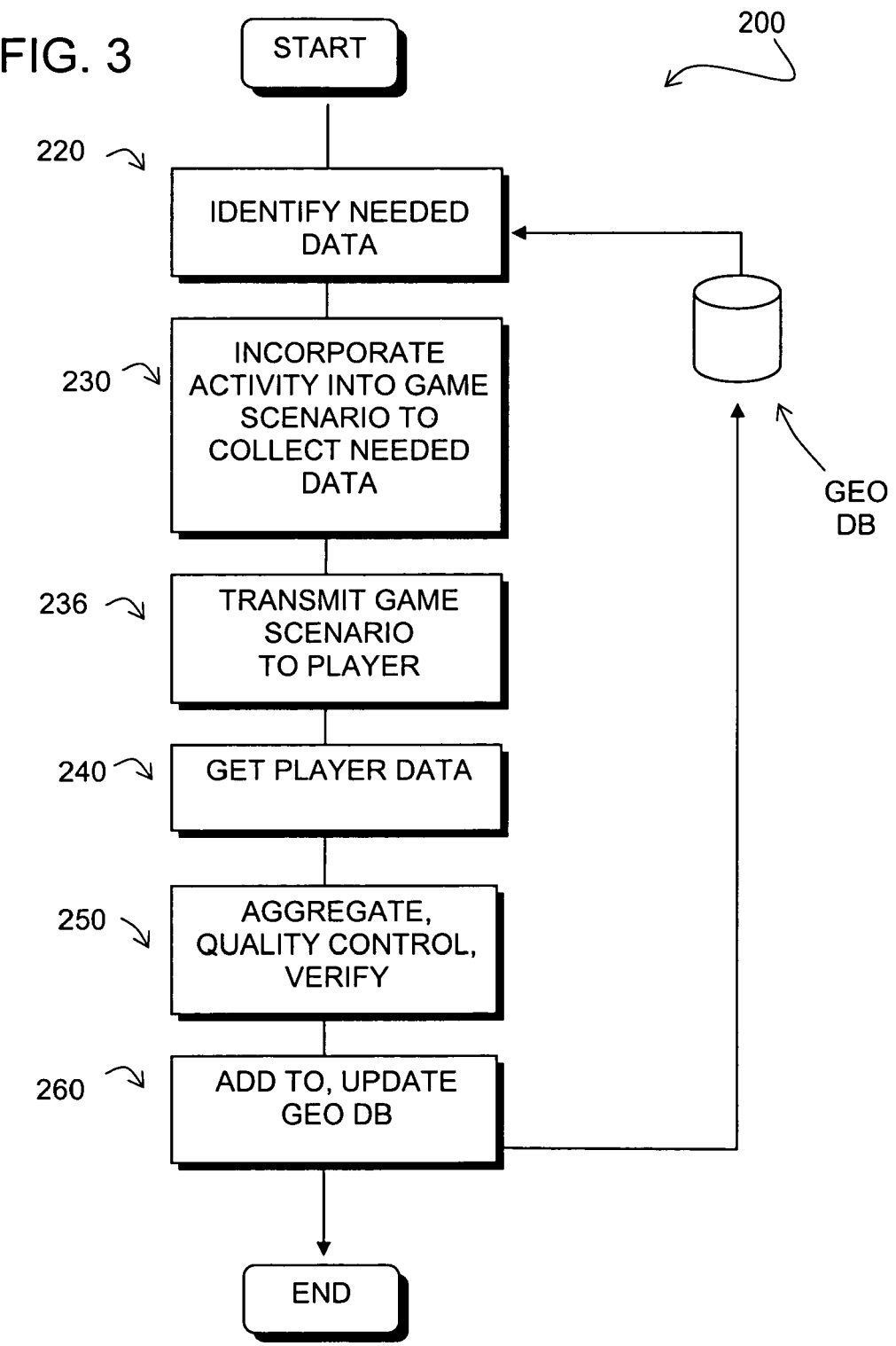

GEOGRAPHIC DATA COLLECTION USING GAME PLAY

BACKGROUND OF THE INVENTION

The present invention relates to collecting geographic data and more particularly, the present invention relates to a process and system that collects geographic data using game play.

Collecting information for a geographic database is a significant task. Not only is the initial collection of data a significant undertaking, but a geographic database needs to be updated on a regular basis. For example, new streets are constructed, street names change, traffic lights are installed, and turn restrictions are added to existing roads. Further, new businesses open, locations of business change, hours of operation change, etc. Also, new levels of detail may be added about geographic features that are already represented in an existing geographic database. For example, an existing geographic database for roads may be enhanced with information about lane widths, shoulder sizes, lane barriers, address ranges, sidewalks, bicycles paths, etc. Thus, there exists a need to continue to collect information for a geographic database.

Methods for collecting data for geographic databases are described in U.S. Pat. Nos. 6,047,234 and 6,816,784, the entire disclosures of which are incorporated by reference herein. According to one embodiment described in U.S. Pat. No. 6,047,234, navigation systems are installed in a plurality of vehicles that are operated for various purposes. As an example, the vehicles may be used by persons for routine, everyday activities, such as commuting, shopping, and so on. These vehicles are also used passively as probes to collect geographic data as the vehicles are driven for these various other purposes. The navigation systems in these vehicles may also provide navigation-related features to the drivers and/or passengers of the vehicles in which they are installed, or alternatively, the navigation systems may serve only to collect geographic data as the vehicles in which they are installed are driven. The geographic data collected by the plurality of vehicles are gathered together, analyzed, and used to update or refine a master geographic database. Copies of the master geographic database, or database products derived from the master copy, can then be distributed back to the navigation systems installed in the plurality of vehicles.

According to one embodiment described in U.S. Pat. No. 6,816,784, positioning equipment is installed in each of a plurality of vehicles that are operated for making deliveries. Geographic data is collected that relates the delivery vehicle positions to the addresses associated with the deliveries.

The embodiments described in U.S. Pat. Nos. 6,047,234 and 6,816,784 afford useful advantages. However, there still exists room for further improvements relating to collection of data for a geographic database.

SUMMARY OF THE INVENTION

To address these and other objectives, the present invention includes a method for collecting geographic data during game play. A game scenario includes an activity for the game player to perform. The game player may be given an incentive within the context of the game for performing the activity. The incentive may be of non-monetary, monetary or nominal value. Performing the activity within the context of the game directly or indirectly results in the generation of data that is collected and used for the purpose of updating or adding to a geographic database.

BRIEF DESCRIPTION OF THE DRAWINGS

FIG. 2 block diagram showing a system for performing one of the steps of FIG. 1.

FIG. 3 is a flowchart showing steps in a process performed by the first embodiment.

DETAILED DESCRIPTION OF THE PRESENTLY PREFERRED EMBODIMENTS

Figure 1:
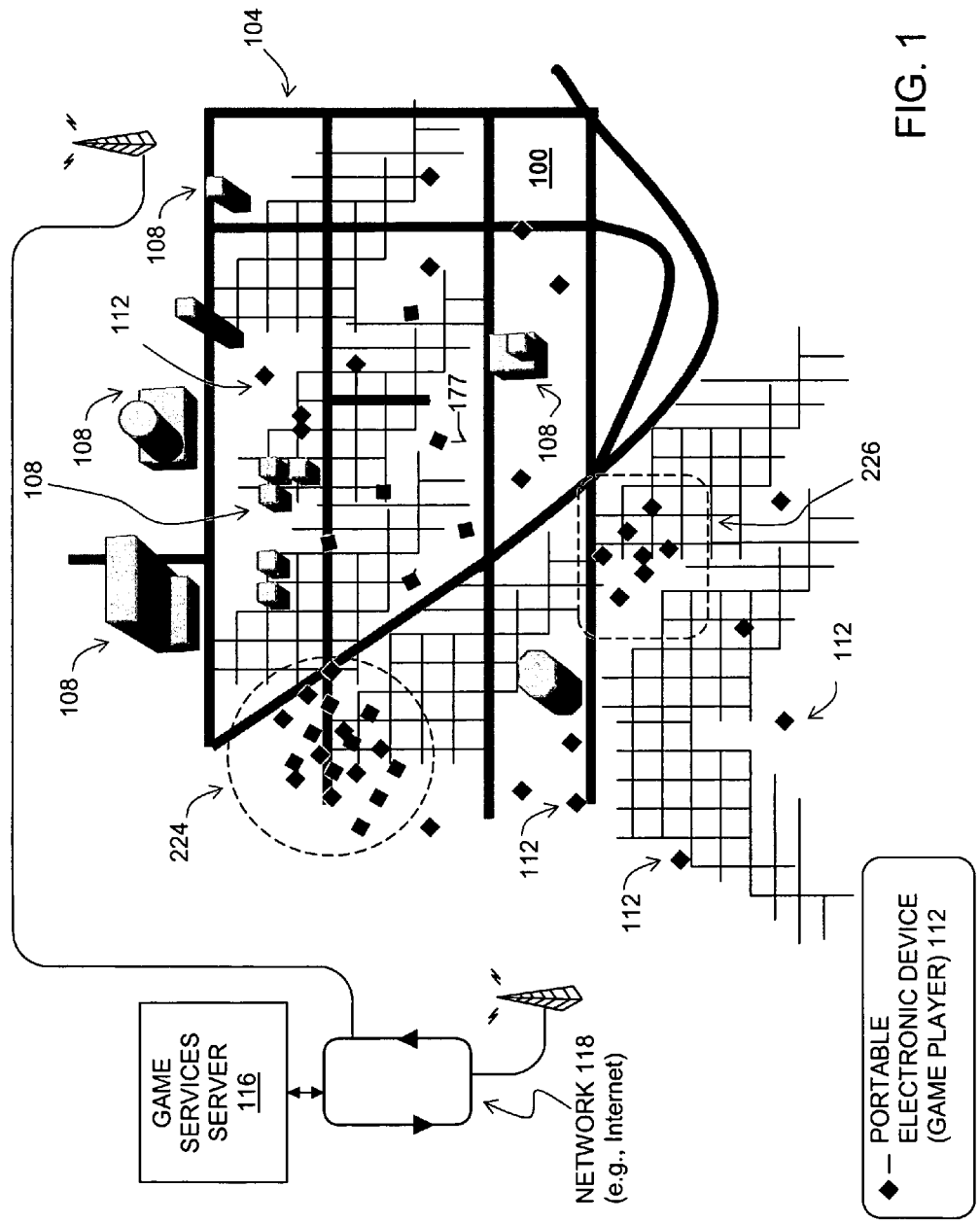
FIG. 1 is a block diagram showing components of an overall system according to a first embodiment.

FIG. 1 shows a geographic area 100. The geographic area 100 may be a portion of a city, state or country. The geographic area 100 may include roads 104 and buildings 108. Located in the geographic area 100 are a plurality of users of portable electronic devices 112. The portable electronic devices 112 can be used for playing games. The portable electronic devices 112 may be implemented on various different hardware and/or software platforms. For example, the different types of portable electronic devices 112 may include conventional mobile phones, general purpose personal digital assistants ("PDAs"), portable media players, portable navigation systems, digital cameras, and dedicated game playing devices. Other types of portable electronic devices may also be used.

A game services server 116 supports the users of the portable electronic devices 112 located in the area 100. The game services server 116 may be located in the geographic area 100 or may be located remotely from the geographic area 100. The users of the portable electronic devices 112 communicate with the game services server 116 over a network 118, at least a part of which includes a wireless network. The wireless portion of the network may be implemented using any technology or combination of technologies, including cellular, satellite, PCS, Bluetooth, WiFi, or any other type of wireless communication.

The network 118 provides for the exchange of data between the users of the portable electronic devices 112 and the game services server 116.

FIG. 2 is a diagram that shows components of one of the portable electronic devices 112 and the game services server 116 in FIG. 1. The portable electronic device 112 and the game services server 116 shown in FIG. 2 are representative examples and are intended to depict only some of the components thereof. It is recognized that there may be various different types of devices and servers with different kinds of components.

The exemplary portable electronic device 112 in FIG. 2 includes hardware and software 128 for exchanging data over the network 118 with the remotely located game services server 116. In addition, the portable electronic device 112 in FIG. 2 includes a user interface 134 for conveying information to and receiving information from the user. The user interface 134 may include a display screen, a keypad, a speaker, a microphone, and so on. Further, the portable electronic device 112 includes a game application 138. The game application 138 may be installed locally on the device 112, remotely on a server (such as the game services server 116), or partly locally and partly remotely. The game application 138 is a software program that supports participation in a computer game.

In the embodiment shown in FIG. 2, the portable electronic device 112 also includes a positioning system 148. The positioning system 148 is a combination of hardware and software components that allows the position of the portable electronic device 112 to be determined. The positioning system 148 may be a GPS unit. In another alternative, the position of the portable electronic device 112 may be determined remotely, e.g., using signal time-of-arrival, signal triangulation, or another technology. In still another alternative, the position of the portable electronic device 112 may be determined by having the user input known current position information into the device, e.g., by speaking or using the keypad.

In FIG. 2, the game services server 116 includes the hardware and software suitable for supporting online computer games with multiple, remotely located users. The game services server 116 includes a communications and data exchange system and applications 150. The communications and data exchange system and applications 150 are operable to communicate and exchange data with the multiple portable electronic devices 112 over the network 118. The game services server 116 includes a game management application 154. The game management application 154 supports one or more online computer games played by the remotely located users of portable electronic devices 112. For example, the game management application 154 may provide the game scenario, keep track of players, scores, and so on. In addition, as explained in more detail below, the game management application 154 is capable of modifying aspects of computer games being played by users on their portable electronic devices 112, including the game scenario, scoring, rewards, hints, and so on.

In one embodiment, the game services server 116 also includes a player position monitoring application 160. The player position monitoring application 160 receives and updates information that indicates the positions of each of the portable electronic devices 112 located in the geographic area 100. The player position monitoring application 160 also receives data from the game server application 154 to keep track of which users (i.e., which portable electronic devices) are playing each supported game.

The player position monitoring application 160 uses a geographic database 184. The geographic database 184 includes information about the locations of roads, address ranges along roads, buildings, points of interest, businesses, and so on, in the geographic area (100 in FIG. 1). The player position monitoring application 160 receives data indicative of a user's position and matches the position to a map position, using the geographic database 184. For example, the player position monitoring application 160 may receive data generated by the positioning system 148 in a user's portable electronic device 112 that indicates the user's latitude, longitude, and altitude. Using this information, the player position monitoring application 160 accesses the geographic database 184 to determine the corresponding street or building location of the user. The player position monitoring application 160 may also accept data indicating a user's position in different formats. For example, if the user indicates his/her own position audibly or through manual input into a keypad, the player position monitoring application 160 interprets this input and converts it to a compatible format.

The game services server 116 also includes a geographic data collection application 176. The geographic data collection application 176 includes several component applications or routines. More specifically, the geographic data collection application 176 includes an application 180 for identifying needed data 182. The component application 180 for identifying needed data is responsive to the geographic database 184. The geographic data collection application 176 also includes a component application 188 for collecting player position data from the player position monitoring application 160, a component application 190 that verifies and performs quality control processes on the collected data, and a component application 194 that updates the geographic database 184 with the collected data. Operation of these component applications is described in more detail below.

Operation

FIG. 3 shows a process 200 performed by the game services server 116 of FIG. 2. The steps in the process 200 may be performed by one or more of the applications on the game services server 116.

In an initial step, the data identification application (180 in FIG. 2, which may be a component part of the geographic data collection application 176) identifies needed data to be collected (Step 220 in FIG. 3). The data identification application 180 may use the geographic database 184 for this purpose. There are various different kinds of needed data that may be collected by the data collection application 176 and identified by the data identification application 180. For example, the data identification application 180 may search for gaps in coverage or may identify data that may need to be updated or confirmed.

Some of the different kinds of needed data that may be collected by the data collection application 176 include the following:

geographic positions of roads, intersections, sidewalks, pedestrian paths, and points of interest, routes, traffic control (e.g., stop signs, stop lights, etc.), traffic conditions (including highway and public transportation), street or business names or addresses, and weather conditions.

The above list is not intended to be exclusive and additional kinds of data may be collected by the data collection application 176.

The game management application 154 uses the identified needed data 182 to generate an appropriate computer game scenario (Step 230). For example, the computer game scenario may be modified in such a manner so as to cause the game player to take an action within the context of the game scenario from which geographic data can be collected. The manner in which the game management application 154 generates or modifies the game scenario depends on the kind of geographic data to be collected, as well as the type of game the player is playing. As an example, if the needed data is the location of or route to a coffee shop, the online computer game scenario may be generated or modified in such a manner that the game player is provided an incentive (e.g., reward) for traveling to the coffee shop. According to another example, if the needed data includes the traffic conditions along a road, the online computer game scenario is generated or modified so that the game player is provided an incentive (e.g., reward) for traveling along the road and indicating specific intersections along the way. Different types of needed data may require different kinds of game scenarios and modifications thereto.

The following list identifies some of the different kinds of needed data that may be collected by the data collection application 176 and the kinds of activities that the game management application 154 may generate or modify a game scenario to include:

geographic positions of roads, intersections, sidewalks, pedestrian paths, points of interest (e.g., indicated by the geographic position of the portable electronic device)

routes (e.g., indicated by the sequence of positions of the portable electronic device)

traffic control (e.g., indicated by the density of positions of the portable electronic device at the locations of intersections)

traffic conditions (e.g., indicated by the density of positions of the portable electronic device along a route or the velocities of portable electronic devices)

street or business names or addresses (e.g., reported by the game player via the portable electronic device user interface)

weather conditions (e.g., reported by the game player via the portable electronic device user interface).

The above list is not intended to be exclusive and additional kinds of game scenarios may be developed and used to collect the needed data.

As stated above, the game management application 154 generates the game scenario to provide an action or activity for the game player to perform so that data generated during performance of the desired action or activity can be collected and used for the purpose of adding to or enhancing a geographic database. The game management application may provide the game player with an incentive to perform the action or activity. In one embodiment, the incentive is a non-monetary incentive, such as game points, game enhancements (e.g., additional game attributes or features), game clues, and so on. Alternatively, the incentive may have minimal or nominal value, e.g., extra game play. In still another alternative, the incentive may have actual monetary value, e.g., money, coupons, discounts, etc. The incentive may be a reward that the game player may be able to trade or sell within the game environment for other items, assets, or service, or for real world items of value, including currency. In yet another alternative, the incentive may not be a reward as such, but may consist of the actual act of performing the activity within the continuing context of the game. These various incentives may be combined.

Once the game management application 154 determines the appropriate game scenario, the game services server 116 transmits the game scenario to the portable electronic device 112 (Step 236). The communications and data exchange application (150 in FIG. 2) may be used for this purpose. After the game scenario is transmitted to the portable electronic device 112, the game is played by the game player, e.g., using the portable electronic device 112. In one embodiment, the player monitoring application 160 on the game services server 116 acquires data from the portable electronic device 112 (Step 240) that indicates the player's activity while playing the modified game. The type of data acquired by the player monitoring application 160 may vary depending on the type of data needed and the type of game scenario that was prepared by the game management application 154. For example, if the kind of needed data is the location of a coffee shop and the game scenario included a reward for traveling to the coffee shop and indicating arrival at the coffee shop using the keypad of the portable electronic device 112, the player monitoring application 160 acquires data that indicates the position of the portable electronic device 112 when the appropriate key is activated. The player's position may be obtained from the positioning system 148 in the portable electronic device 112. According to another example, if the kind of needed data is the name of a business at a specific location and the game scenario included a reward for traveling to the location and indicating the name of the business via the user interface 134 of the portable electronic device 112, the player monitoring application 160 acquires the data that indicates the position of the portable electronic device 112 when the name is entered.

On the game services server 116, the data acquired from the portable electronic device 112 may be processed (Step 250). For example, the data acquired from the portable electronic device 112 may be aggregated with data collected from other portable electronic devices. This aggregated data may be subjected to statistical analysis. Also, the data acquired from the portable electronic device 112 may be subjected to verification and other quality control procedures.

Once the data acquired from the portable electronic device 112 is processed, the data is added to or used to update or modify the geographic database 184 (Step 260). For example, the data may be used to update existing data in the geographic database 184. Alternatively, the data may be used to expand coverage of the geographic database 184, e.g., by adding data about new roads, walkways, points of interest, etc. Alternatively, the data may be used to confirm or verify data already in the geographic database, e.g., confirming that a business is still in operation at a certain location. In another alternative, the data may be used to supplement the data in the geographic database 184, e.g., by adding current traffic or weather conditions.

Advantages

One of the advantages of the embodiments described above is that the game player can be directed to collect specific data that might otherwise be difficult to obtain with passive probe data collection systems. With passive probe data collections systems, data is collected from users who are engaged in activities entirely unrelated to data collection. Thus, with passive systems, there is no guarantee that any probe data vehicle or device will travel to a specific location or collect certain data. By comparison, with the disclosed embodiments, a game player can be directed to proceed to a specific location as part of a game scenario.

Another advantage of the disclosed embodiments is that specific kinds of data can be collected with relatively little expense. i.e., because a game player can be provided a non-monetary incentive to perform a certain activity needed to collect the data.

Additional Features and Alternatives

The embodiments described herein are not limited to only games played by players with portable electronic devices. Depending on the type of data needed to be collected to update the geographic database, embodiments may include games played by users with non-mobile (including non-portable) electronic devices, or a combination of users with mobile electronic devices and users with non-mobile (including non-portable) electronic devices.

The disclosed embodiments are not limited to using portable electronic devices that have wireless communication capability. Portable electronic devices that do not have a wireless communications capability but instead have the ability to connect to a network (e.g., via a USB cable or other physical connector) to download new scenarios, game information and to upload information may be used.

The kind of geographic data collected by the disclosed embodiments may also include data for game development purposes. As an example, a game developer first creates a game that has geographic aspects (e.g., is set in a real city). Then, the game developer sends players out to play the game and have them collect geographic data (e.g., street layouts, pictures of building, etc.) as part of the game scenario. The game developer then uses the data to make the game more realistic, and may modify the game play itself based on the new geographical information. This new geographic data may also be used for computer game development purposes, such as disclosed in U.S. patent application Ser. Nos. 10/798,459, 10/798,531, 10/798,632, and 10/798,703, the entire disclosures of which are incorporated herein by reference.

In another alternative, an online computer game may use vehicles and drivers as game pieces, controlled by players in a multi-player online game, such as a fantasy commuter league game where players select participating commuters and follow their progress each day as they commute to and from work. Game players would receive points for the fastest commute times (while complying with applicable legal restrictions). The routes taken by the frequent winners and worst losers would be collected and analyzed for developing routes for other drivers.

Another feature that may be incorporated in the disclosed embodiments is to provide incentives to game players to interact with other game players (or non-game players). For example, the disclosed embodiments may provide incentives to game players to interact with or recruit others into the game, e.g., to collect spatial data. Another feature that may be incorporated into the disclosed embodiments is to provide incentives to game players to coordinate teams or groups (e.g., hierarchical groups) of players (or non-game players) within the game environment to collect certain types of data.

The data collected with the disclosed embodiments may not used itself for purposes of adding to a geographic database, but instead may be used for quality control purposes, e.g., to confirm geographic data collected by other means.

According to yet another alternative, the game may be a non-computer game that uses a phone or other electronic device only for positioning and/or conveying game instructions/activities.

In the above embodiments, it was disclosed that the portable electronic device included a positioning system, such as a GPS unit. Alternatively, the portable electronic device may not have a positioning system. Instead, the portable electronic device may have only communications capability and the game scenario may direct the game player to a stationary location zone, such as within broadcast range of WiFi, SSID, or visual sight of a landmark.

The disclosed embodiments may be used for determining whether public transportation is on schedule, e.g., by monitoring the positions of game players who are traveling on public transportation.

It is intended that the foregoing detailed description be regarded as illustrative rather than limiting and that it is understood that the following claims including all equivalents are intended to define the scope of the invention.

We claim:

1. A method for collecting geographic data using game play, the method comprising:
   providing data representing a computer game scenario to a user device, the computer game scenario displayed on a user interface of the user device for game play, wherein the computer game scenario on the user device prompts a game player to perform an activity including physically moving to a specified location;
   collecting real-world geographic data generated during performance of the activity, the collected real-world geographic data including a name of a street or a name of a business; and
   using the collected real-world geographic data to update, add to, or supplement a navigation database including adding the name of the street or the name of the business in the navigation database, the navigation database remote from the user device.

2. The method of claim 1 further comprising:
   giving the game player an incentive within the game scenario for performing the activity.

3. A method for collecting geographic data to update a navigation database, the method comprising:
   providing a non-monetary incentive within a game context of a computer game to a player of the computer game, wherein the player plays the computer game on a portable wireless electronic device, wherein the non-monetary incentive is provided for performance of an activity by the player, the activity including traveling to a real-world location;
   monitoring the activity;
   storing real-world geographic information based on the monitoring of the activity, the real-world geographic information including a name of a street; and
   using the real-world geographic information to update data representing geographic features of the navigation database including adding the name of the street in the navigation database, the data representing the geographic features including data representing roads in a geographic area.

4. The method of claim 3 wherein the step of monitoring includes receiving data from GPS equipment operatively coupled to the portable wireless electronic device that indicates a physical location thereof.

5. The method of claim 3 wherein the physical location is a store location of a business chain.

6. The method of claim 3 wherein the activity is reporting a name of a street.

7. The method of claim 3 wherein the activity is reporting a name of a business.

8. The method of claim 3 wherein the data added to the geographic database indicates a position of a road.

9. The method of claim 3 wherein the data added to the geographic database indicates a position of a business.

10. The method of claim 3 wherein the data added to the geographic database indicates traffic conditions.

11. The method of claim 3 wherein the data added to the geographic database indicates weather conditions.

12. The method of claim 3 further comprising:
    aggregating information based on the monitoring of the activity of multiple players of games; and
    using the aggregated information when adding data to the geographic database.

13. The method of claim 3 further comprising:
    performing quality control processes on the information.

14. The method of claim 3 wherein the steps of providing a non-monetary incentive and monitoring the activity are performed by a game services server.

15. The method of claim 3 further comprising:
    formulating a game scenario to cause the player to perform the activity.

16. The method of claim 15 wherein the step of formulating is performed by a game services server.

17. The method of claim 3 further comprising:
    using the navigation database to identify needed data;
    identifying the activity to be performed by the player to collect the needed data; and
    formulating a game scenario that includes the activity.

18. The method of claim 3 further comprising:
    transmitting a game scenario that includes the activity to the portable wireless electronic device.

19. A method for collecting geographic data to update a navigation database, the method comprising:
    providing an incentive of nominal monetary value within a game context of a computer game to a player of the computer game, wherein the player plays the computer game on a portable wireless electronic device, wherein the incentive of nominal monetary value is provided for performance of an activity by the player, the activity including moving from one real-world location to another real-world location;
    monitoring the activity;

storing real-world geographic information based on the monitoring of the activity, the real-world geographic information including a name of a business or a store; and using the real-world geographic information to update data representing geographic features of the navigation database including adding the name of the business or the store in the navigation database.

20. The method of claim 19 wherein the incentive of nominal monetary value includes additional game play.

21. A method for collecting geographic data to update a master navigation database, the method comprising:

providing an incentive within a computer game scenario of a computer game, the computer game scenario displayed on a user interface of a portable wireless electronic device, wherein the incentive is provided to a computer game player engaged in computer game play on the portable wireless electronic device to perform an activity, the activity including movement to a real-world location;

monitoring the activity;

storing real-world geographic information based on the monitoring of the activity, the real-world geographic information including a street address or a business address; and using the real-world geographic information to update the master navigation database including adding the street address or the business address in the master navigation database, the master navigation database separate from the portable wireless electronic device, wherein the incentive includes a coupon.

22. A method for collecting geographic data using game play, the method comprising:

identifying needed data in a geographic database, the needed data including a name of a road or a business;

identifying an activity to be performed by a computer game player to collect the needed data, the activity including physically moving to a real-world location;

formulating a game scenario of a computer game that prompts the computer game player to perform the activity;

providing data representing the game scenario that prompts the activity for the computer game player to perform to a user device, the game scenario displayed on a user interface of the user device in which the computer game is being played on, wherein the activity for the computer game player to perform causes a measurable effect;

measuring the effect; and using the measured effect to update, add to, or supplement the geographic database with the needed data including adding the name of the road or the business in the geographic database, the geographic database remote from the user device, wherein the geographic database contains data representing roads in a geographic area including data representing turn restrictions of the roads, address ranges along the roads, street names of the roads, and locations of the roads.

23. A method for collecting geographic data using game play to update a master database, the method comprising:

providing data representing computer game scenarios to respective user devices, the computer game scenarios displayed on respective user interfaces of the respective user devices for a plurality of computer game players to perform a respective activity including movement to a real-world location;

collecting real-world geographic data including a name of a street or a name of a business from each of the respective user devices of the plurality of computer game players, the collected real-world geographic data generated during performance of the respective activities of the plurality of computer game players; and using the collected real-world geographic data to update the master database including adding the name of the street or the name of the business in the master database, the master database separate from the respective user devices of the plurality of computer game players.

24. A method for collecting geographic data using game play, the method comprising:

providing data representing a computer game scenario of a computer game to a user device, the computer game scenario displayed on a user interface of the user device in which the computer game is played on, wherein the computer game scenario on the user device prompts a game player to perform an activity, wherein the activity includes physical movement to a real-world location;

collecting real-world geographic data generated during performance of the activity, the real-world geographic data including a street address or a business address; and using the collected real-world geographic data to update, add to, or supplement a geographic database including adding the street address or the business address in the geographic database, wherein the geographic database contains data representing roads in a geographic area including data representing turn restrictions of the roads, address ranges along the roads, street names of the roads, and location of the roads.

* * * * *